United States Patent
Schaffer et al.

(10) Patent No.: US 7,133,911 B1
(45) Date of Patent: Nov. 7, 2006

(54) RESPONSE TIME ANALYSIS OF NETWORK PERFORMANCE

(75) Inventors: Steven J. Schaffer, Lone Tree, CO (US); Jacob Weil, Palo Alto, CA (US)

(73) Assignee: Compuware Corporation, Detroit, MI (US)

( * ) Notice: Subject to any disclaimer, the term of this patent is extended or adjusted under 35 U.S.C. 154(b) by 792 days.

(21) Appl. No.: 09/800,080

(22) Filed: Mar. 5, 2001

(51) Int. Cl.
*G06F 15/173* (2006.01)
*G06F 15/16* (2006.01)

(52) U.S. Cl. ............ 709/224; 709/202; 709/223; 709/236; 370/468

(58) Field of Classification Search ........ 709/200–203, 709/223–224, 236; 370/389–394, 458, 468; 703/19–22
See application file for complete search history.

(56) References Cited

U.S. PATENT DOCUMENTS

| | | | | |
|---|---|---|---|---|
| 5,375,070 A | * | 12/1994 | Hershey et al. | 709/224 |
| 5,974,442 A | * | 10/1999 | Adams | 709/200 |
| 6,393,480 B1 | * | 5/2002 | Qin et al. | 709/224 |
| 6,584,501 B1 | * | 6/2003 | Cartsonis et al. | 709/224 |
| 6,747,985 B1 | * | 6/2004 | Lovette | 370/460 |
| 6,956,852 B1 | * | 10/2005 | Bechtolsheim et al. | 370/389 |

* cited by examiner

*Primary Examiner*—Bharat Barot
(74) *Attorney, Agent, or Firm*—Fenwick & West LLP

(57) ABSTRACT

A system and method are described for analyzing the performance of a network while processing an application. The method involves measuring and calculating the amount of time nodes are active processing and sending frames, as well as the amount of time that frames spend traversing the network. Graphical user interfaces are provided to effectively present significant measurements and calculations.

6 Claims, 6 Drawing Sheets

200 — Overall Summary

| Task Time (sec.) | 79.37 |
|---|---|
| Traffic Duration (sec.) | 55.01 |
| Errors | |
| Capture Environment | Client Side <--> Server Side |

| | Conv | Threads | Turns | Bytes/Turn |
|---|---|---|---|---|
| Total | 1 | 131 | 333 | 541.9 |
| <--> | 1 | 131 | 333 | 541.9 |

202 — Traffic

| | Bytes | % of <--> Bytes | Frames | Avg Frame | Captured Load (Kbps) | Captured Load (%) | Frames Missing at Source |
|---|---|---|---|---|---|---|---|
| Total | 180462 | | 955 | 189.0 | | | |
| <--> | 180462 | | 955 | 189.0 | | | |
| --> (64 kbps) | 141800 | 78.58 | 510 | 278.0 | 14.29 | 22.30 | 0 |
| <-- (64 kbps) | 38662 | 21.42 | 445 | 86.9 | 3.90 | 6.10 | 0 |

204 — Network Busy Time

| | Insertion Time (sec) | Insertion Time (%) | QPP Time (sec) | QPP Time (%) | Total (sec) | Total (%) |
|---|---|---|---|---|---|---|
| --> (64 kbps) | 17.73 | 22.33 | 24.23 | 30.53 | 41.96 | 52.86 |
| <-- (64 kbps) | 4.83 | 6.09 | 8.04 | 10.13 | 12.87 | 16.22 |

206 — Network Frame Transit Statistics

| | Transit Time Min (sec) | Transit Time Avg (sec) | Transit Time Max (sec) | Frame Count | Overlap Avg (Frame) | Overlap Max (Frame) |
|---|---|---|---|---|---|---|
| --> (64 kbps) | 0.014 | 0.263 | 1.271 | 494 | 5.54 | 16 |
| <-- (64 kbps) | 0.014 | 0.023 | 0.080 | 347 | 1.28 | 2 |

208 — Node Activation

| | Processing Time (sec) | Sending Avg (sec) | Sending Max (sec) | Sending (%) | Total (sec) | Total (%) |
|---|---|---|---|---|---|---|
| Client 206.40.55.195 | 31.51 | 39.70 | 4.59 | 5.78 | 36.10 | 45.48 |
| Server 199.199.199.2 | 14.37 | 18.10 | 0.00 | 0.00 | 14.37 | 18.10 |
| Total | 45.88 | 57.80 | 4.59 | 5.78 | 50.47 | 63.59 |

210 — Node Processing Statistics

| | Processing Min (sec) | Processing Avg (sec) | Processing Max (sec) | Processing Periods | Overlap Avg | Overlap Max |
|---|---|---|---|---|---|---|
| Client 206.40.55.195 | 0.0001 | 0.096 | 21.506 | 327 | 1.00 | 1.00 |
| Server 199.199.199.2 | 0.0001 | 0.045 | 1.884 | 324 | 1.01 | 1.01 |

Fig. 2

RESPONSE TIME ANALYSIS OF NETWORK PERFORMANCE

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights. The following notice applies to the software and data as described below and in the drawings hereto: Copyright© 2001, Compuware, All Rights Reserved.

FIELD OF THE INVENTION

The present invention relates to the field of network computing, and more particularly, to a method and system for monitoring network, client, and server performance.

BACKGROUND OF THE INVENTION

One method of monitoring network performance is by measuring the processing time on a first node, such as a client, and the processing time on a second node, such as a server. In conventional approaches, this approach was applied where the client and server were on the same local area network (LAN), so that factors such as network delay external to the LAN did not need to be considered.

Realistic implementations involve networks that generally include multiple LANS and interconnecting equipment and/or communications links. Thus, there is a need for an improved system and method of monitoring network performance whereby network delay is considered when monitoring network performance.

SUMMARY OF THE INVENTION

In one aspect of the invention, a method for monitoring network performance is disclosed. The method monitors a flow having one or more frames within a thread by calculating a node's active time. This includes the amount of time each frame is processed on a sending node in a network, the amount of time each frame is processed on a receiving node in the network, and the amount of time each frame is in transit across the network.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 illustrates an Application Performance Report in a Details format.

DETAILED DESCRIPTION OF THE INVENTION

The present invention includes various operations, which will be described below. These operations may be performed by hardware components or may be embodied in machine-executable instructions, which in turn may be used to cause a general-purpose or special-purpose processor or logic circuits programmed with the instructions to perform the operations. Alternatively, the operations may be performed by a combination of hardware and software.

The present invention may be provided as a computer program product that may include a machine-readable medium having stored thereon instructions which may be used to program a computer (or other electronic devices) to perform a process according to the present invention. The machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electromagnetic Erasable Programmable Read Only Memories), magnetic or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Introduction

Response Time Analysis (hereinafter RTA) first produces underlying data. This data is then formatted and presented to a user in several reports, including the Application Performance Report (Chart and Details), Node Processing Time Report, and Flows Report. The reports are presented in the form of a Graphical User Interface (GUI).

The user's first exposure to the response time analysis is in the high-level summaries presented in the health report. The summaries enable the user to quickly obtain critical information without needing to process details. Details are made available in the Node Processing Time report and Flows Report.

The following sections give a thorough description of the algorithms and techniques used in the underlying RTA, as well as examples of the GUI.

Application Performance Report

Chart

Figure 1:
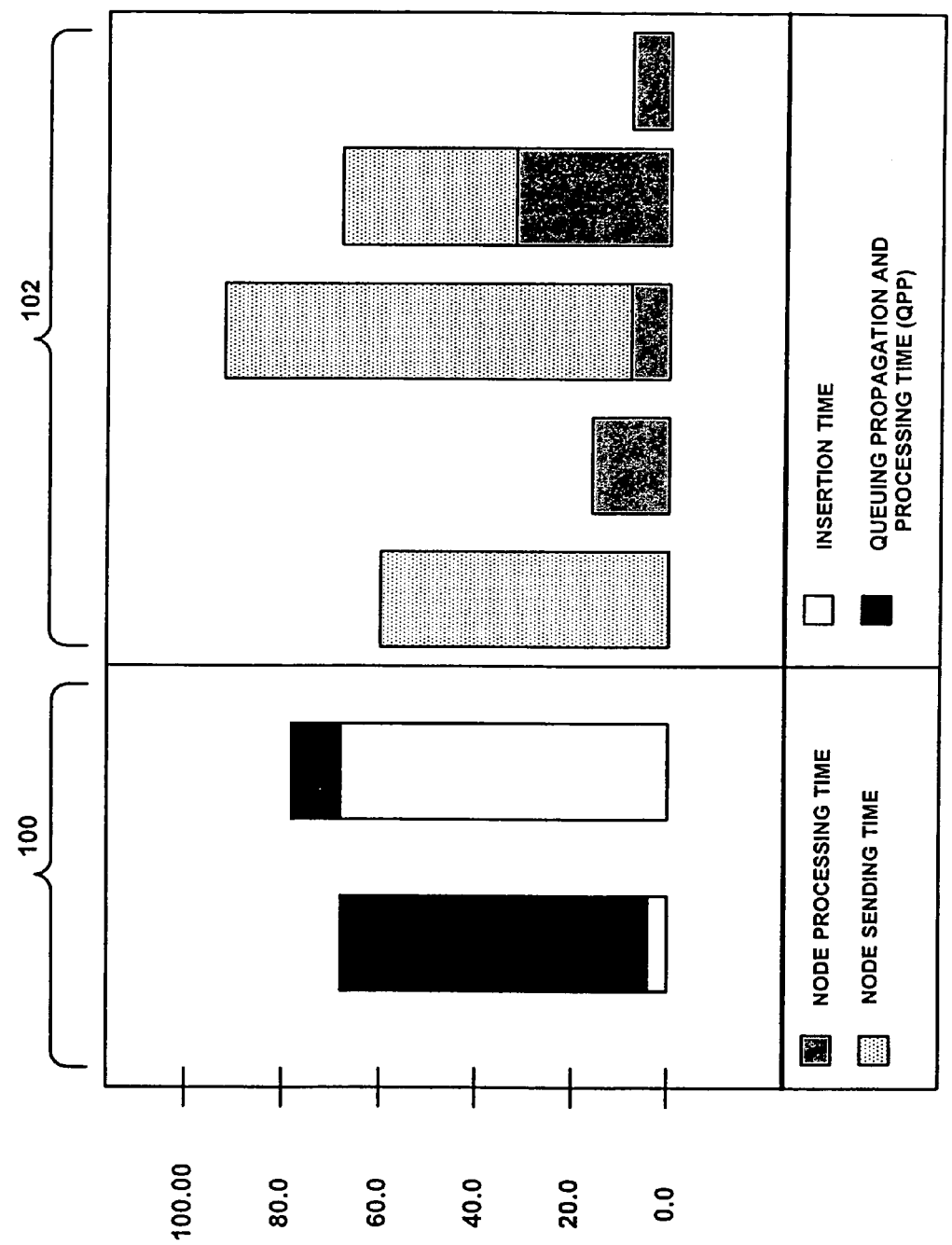
FIG. 1 illustrates an Application Performance Report in a Chart format.

FIG. 1 illustrates an Application Performance Report. The four summary results shown in the first panel of the application performance report are given in the following paragraphs.

Network Busy Time

The Network Busy Time 100 is the total time that one or more meaningful frames are in transit across the network. Network Busy Time is computed and reported for both network directions (from primary to secondary and vice-versa). After the Flow concept has been introduced the Network Busy Time will be revisited to describe which frames are meaningful. Because only a subset of all frames generated traverse the network, only frames that are exchanged between the two capture points are included in the Network Busy Time. Consequently, Network Busy Time is applicable only with a multi-segment merged or adjusted trace. A trace is a sequence of frames that have flowed between two or more nodes over the capture period (to be discussed below). Traces can be merged and adjusted. The Network Busy Time can be broken down into insertion time and queuing propagation and processing time.

Insertion Time (sec): This is the cumulative time for the frames to be inserted into the network. In a merged or adjusted trace, the insertion time for each frame is computed as AdjustedBytes*8/Bandwidth. The network bandwidth utilization is computed for each direction of the network. Only frames that are known to have traversed the network are included. The term AdjustedBytes is used in the above expression to indicate the bytes that would have traversed the WAN link. The capture environment allows the user to specify whether the frame size should be adjusted to compensate for the different WAN headers. If the user chooses to do so, then AdjustedBytes=Bytes(as captured)−DLCHeader(as captured)+DLCHeader (specified in capture environment).

Network Queuing, Propagation & Processing (QPP) Time (sec) This is the time that frames were present in the network due to queuing (in routers), processing and propagation. This represents the portion of the total transit time that is not counted as insertion time. Throughout the description, this term is referred to as QPP time.

Node Active Time

Referring again to FIG. 1, in the Node Active Time area 102, there is one bar for each node that shows the active (processing or sending) duration. Each bar is broken down into the following two components.

Node Processing Time For each node, the overall task processing time is shown. A task is a user-invoked operation that creates network traffic during execution and causes a screen update or other acknowledgement on the user's machine. Once invoked, a task executes to completion without further user intervention.

For single-thread applications, this is simply the sum of the individual node processing times (described below). If an application can have multiple server requests outstanding (such as the typical Web browser), then the node is considered processing if it is handling one or more requests. The Node Processing Time for any node cannot exceed the task duration, whereas the sum of the Processing Times for all nodes can exceed the task duration if there are parallel (overlapping) threads.

Node Sending Time For each node, the overall node sending time represents the period during which the node is sending data but not otherwise processing. If a node is in the process of sending a set of frames, then the node is considered to be in the sending state, but only if it is not processing another request at the same time. Sending time is important because it could indicate that the node is processing in order to prepare the remaining frames, or otherwise not processing. The most likely other factor is that the network is heavily utilized and the node cannot send all data in one transaction. Other potential scenarios include insufficient TCP window size, the normal slow-start nature of TCP, inability of the receiving node to remove the data from the TCP buffer quickly enough, or an inefficient TCP implementation at either the sending or receiving node.

Referring again to FIG. 1, the following detailed reports are available by double-clicking certain areas as discussed in the following paragraphs.

On a Node Processing Time portion of a node bar: Brings up the Node Processing Detail report filtered/highlighted on the specified node.

On a Node Sending Time portion of a node bar: Brings up the Node Sending Detail report filtered/highlighted on messages sent by the specified node.

On either network bar 100: Brings up the Network Utilization and Latency graph.

Details

An example of an Application Performance Report—Details is shown in FIG. 2. The major sections of the detailed report are described in the following sections.

Overall Summary

The overall summary 200 provides information on the task duration, any errors that were detected, the capture environment, and a summary of the conversations, threads and turns. The information in the overall summary can alert the user to errors, or to the fact that other than the desired information was captured. The values displayed in this section are as follows.

Task Time (sec) This is the duration of the task, and should be equivalent to the task "stopwatch time." If this is not the case, then portions of the time may be missing or may need to be deleted.

Traffic Duration (sec) This is the duration within which frames exist. The user can click on the label to open the bounce diagram, which will show all constituent frames and their durations.

Errors A click on the Errors label opens the Error Report, which is a graphical summary of the number and types of errors and warnings detected in the trace.

Capture Environment This legend indicates the meaning of the arrows shown in many other places within the report. A capture is a process whereby a traffic collector or agent collects network frames exchanged between nodes in a distributed application and stores the data for off-line analysis. The legend keys are taken from the Capture Environment as specified by the user. The primary capture location is indicated on the left and the secondary location is on the right.

Conv indicates Conversations, both for the task and the total, and those that occur between a node on the primary location and another node in the secondary location, as indicated by the "<-->" label. Hereafter, the phrase "conversations that traverse the network" means conversations for which one node is in the primary location and the other is in the secondary location.

Threads This shows both the total number of threads in the task as well as in the conversations that traverse the network between the primary and secondary capture points. A thread is a sequence of frames exchanged between two nodes that constitutes a single application or protocol action. For example, the retrieval of a graphic from a WWW (World Wide Web) server is a thread.

Turns This is the number of turns in the task, and in the conversations that traverse the network between the primary and secondary capture points. <--> Turns specifies the sum of the turns for threads corresponding to one node in the primary location and another other node in the secondary location.

Bytes/Turn This is the average number of bytes per turn, both as a total for the task and for the conversations that traverse the network.

Frames/Turn (not shown) This is the average number of frames in each turn, both as a total for the task and for the conversations that traverse the network.

Traffic

Traffic section 202 provides the user with a summary of several traffic measures, for the entire task (Total row), over the network (<--> row, i.e., in both directions between the primary and secondary capture points), and in each direction across the network. Columns in this section are discussed in the following paragraphs.

Bytes This is the sum of the bytes for all frames in each classification. For the network classifications, the byte counts for each frame will be adjusted for the DLC header size if the user has chosen to do so in the capture environment.

For <-->, → and ← Bytes, the value is the number of bytes that crossed the point of contention in the network as specified for the task in the Capture Environment. If the user did not choose to adjust frames for DLC header in the capture environment, then Network Bytes=Bytes for each frame. If the user did so choose, then Network Bytes=Bytes−DLC Header(as captured)+DLCHeaderbytes (specified in the capture environment).

% of <--> Bytes This column shows the percentage of <--> bytes that traversed the network in each direction. The two values will add to 100% (subject to rounding).

Frames This is the total number of frames in the task (top row), and the number of frames that should have crossed the network, whether they were contained in both captures or not. If they were not, such will be reported in the two Frames Missing entries to the right of this section. A frame is a collection of bits comprising data and control information (overhead) that is transmitted between nodes in a network.

Avg Frame This is the average frame size, in bytes, i.e., Bytes/Frames.

Captured Load (kbps and %) This is the average rate, in kbps and as a percentage of the total bandwidth, of the frames that traversed the network in each direction. The adjusted bytes, as discussed above, are used.

Frames Missing at Source This is the number of additional frames from the sending (source) node that should have been in the trace. This can be caused by the capture beginning too late or ending too early, or by the inability of the capture device to capture all of the frames.

Frames Missing at Destination (not shown) This is the number of additional frames that should have been in the trace from the receiving (destination) node. Such frames could have been lost due to network congestion or failure of a network component, or for the reasons discussed in the preceding paragraph.

There can be other situations wherein not all of the frames that should have traversed the network were actually captured. For example, one of the captures may have started before or ended after the other and may contain frames that traversed the network. However, since those frames are not represented in the other capture, it is not known if they actually traversed the network. Such frames will be flagged Lost Frame or Dropped Frame, depending on whether they were captured only at the source or destination segment, respectively.

If it is assumed that missing frames really did traverse the network, then their bytes/frames/threads/conversations are included in the <--> metrics. There is no way to know whether a frame that is missing at the destination actually consumed bandwidth at the network contention point before being dropped. Thus, the worst case is assumed, i.e., that network bandwidth was consumed, and the missing frames are included in the <--> metrics.

Network Busy Time

The Network Busy Time section 204 helps the user determine how active the network was during the task, and how the busy time breaks down into insertion time and QPP time.

The Network Busy Time section 204 is presented for merged tasks and single-trace adjusted tasks. There are two rows for the network metrics, one for the primary to the secondary location (→), and the second from the secondary to the primary location (←). The columns in this section correspond exactly to the portions of the network bars 100 in the Application Performance Report chart of FIG. 1.

Insertion Time (sec and % of Task Time) This information represents the cumulative time that it took to insert the captured frames into the network at the point of lowest bandwidth specified by the user. Should the user decide to adjust for DLC headers of the network by the captured bytes, the insertion time is based on the network bytes of each frame. The bandwidth utilization in kbps is determined as (Bytes that traversed the network in the specified direction*8)/(duration of the task in seconds*1000). The bandwidth utilization in % is (the bandwidth utilization in kbps/capacity of the link in kbps), expressed as a percentage. The capacity of the link is specified by the user in the capture environment.

QPP Time (sec and % of Task Time) This is the Queuing, Processing and Propagation time.

Total (sec and % of Task Time): The total time that one or more meaningful frames was traversing the network. Meaning frames include all data frames and TCP acknowledgements that are within the data portion of a message. Meaningful frames do not include TCP acknowledgements that are sent after the last data frame in a message is sent.

Network Frame Transit Statistics

The network frame transit statistics section 206 comprises 2 rows, one for each network direction as described above. This section includes only meaningful frames. As such, the statistics do not include TCP acknowledgements that are sent after the last data frame in a message is sent.

Transit Time (sec) This column will reflect the graphical depiction of the minimum, average and maximum frame transit time. The transit time of each frame is the difference between its Time Sent and Time Received.

Transit Time Min (sec) This is the transit time of the frame that has the lowest transit time.

Transit Time Avg (sec) This is the average (mean) transit time for the meaningful frames.

Transit Time Max (sec): This is the transit time of the frame that has the largest transit time.

Transit Time Frame Count This is the number of frames included in the transit time statistics, and is equal to the number of meaningful frames that were captured at both sides (or adjusted). Note that this number is equal to or less than the number of frames that traversed the network in the specified direction. It does not include TCP acknowledgements after a message or frames that are missing at the source or destination.

Latency Statistics (min, avg, max, not shown) These are statistics on the latency of meaningful frames that traverse the network. As described above, meaningful frames are data frames and the TCP acknowledgements that occur during the data transfer portion of a flow.

Overlap Avg (Frame) This is the average number of frames that are in transit when there is at least one frame in transit. It is a measure of the application's ability to send more than one frame at a time, and the network conditions requiring the application to do so. In other words, it is the average number of frames sent by the application when the application has sent frames. Higher values mean the application is less susceptible to network latency and bandwidth.

Overlap Max (Frame) This is the largest number of frames that are in transit in the network at any given time.

Node Active Time

This is a tabulation 208 of the node bars 102 (Node Processing And Sending times) that were described earlier in the Application Performance Report Chart of FIG. 1.

Node Processing Statistics

Statistics 210 regard the node processing periods, as discussed in the following paragraphs.

Processing Time (sec) This reflects a graphical depiction of the minimum, average and maximum node processing time period.

Processing Min (sec) This is the shortest node processing period.

Processing Avg (sec) This is the average node processing period.

Processing Max (sec) This is the longest node processing period.

Processing Periods This is the number of processing periods, and is important as it tells the user if there is a large or small number of node processing periods.

Overlap Avg This is the average number of processing periods that occur simultaneously at the node during the times that the node is in at least one processing period. A value of 1.0 means that the node never processed more than one request at a time. This value cannot be smaller than 1.0.

Overlap Max This is the largest number of processing periods occurring at any given instant.

Node Processing Detail Report

In addition to the overall summary results presented in the Application Performance Report, the RTA also identifies and reports several sets of details. One of these is the node processing detail (not shown).

Each node processing time is one component in the Overall Node Processing Time. The GUI allows the operator to see the Individual Node Processing Times for all nodes or for one node at a time. Note that since individual node processing times can overlap, the sum of the individual node processing times can be greater than the Overall Node Processing Time for a given node. The attributes of each node processing time, as given in the columns in the Node Processing Detail Report are listed or described in the following sections.

Node Name

Node Address

Errors This is the number of errors associated with either the start or the end frame. The user can click on the error report to see the individual errors.

Duration This is the time span of the processing time, in seconds.

Start Time This is the time at which the node began processing

Start Frame This is the number of the frame captured at the beginning of the processing time. The user can click on this parameter to view the bounce or packet trace as of the start frame.

End Time This is the time at which the node stopped processing.

End Frame This is the number of the frame captured at the end of the processing time. The user can click on this parameter to view the bounce or packet trace at the end of the frame.

Start Frame Description This is the description (decoded) of the start frame.

End Frame Description This is the description (decoded) of the end frame.

Node Processing Type This is one of the types specified in the sections below. For most node processing types, there are corresponding types for client and server. "Client" is assigned when the node is the client in a thread, and vice versa. Each node processing type has an internal code that does not appear in the GUI. The node processing types and their meanings are given in the following sections.

Figure 3:
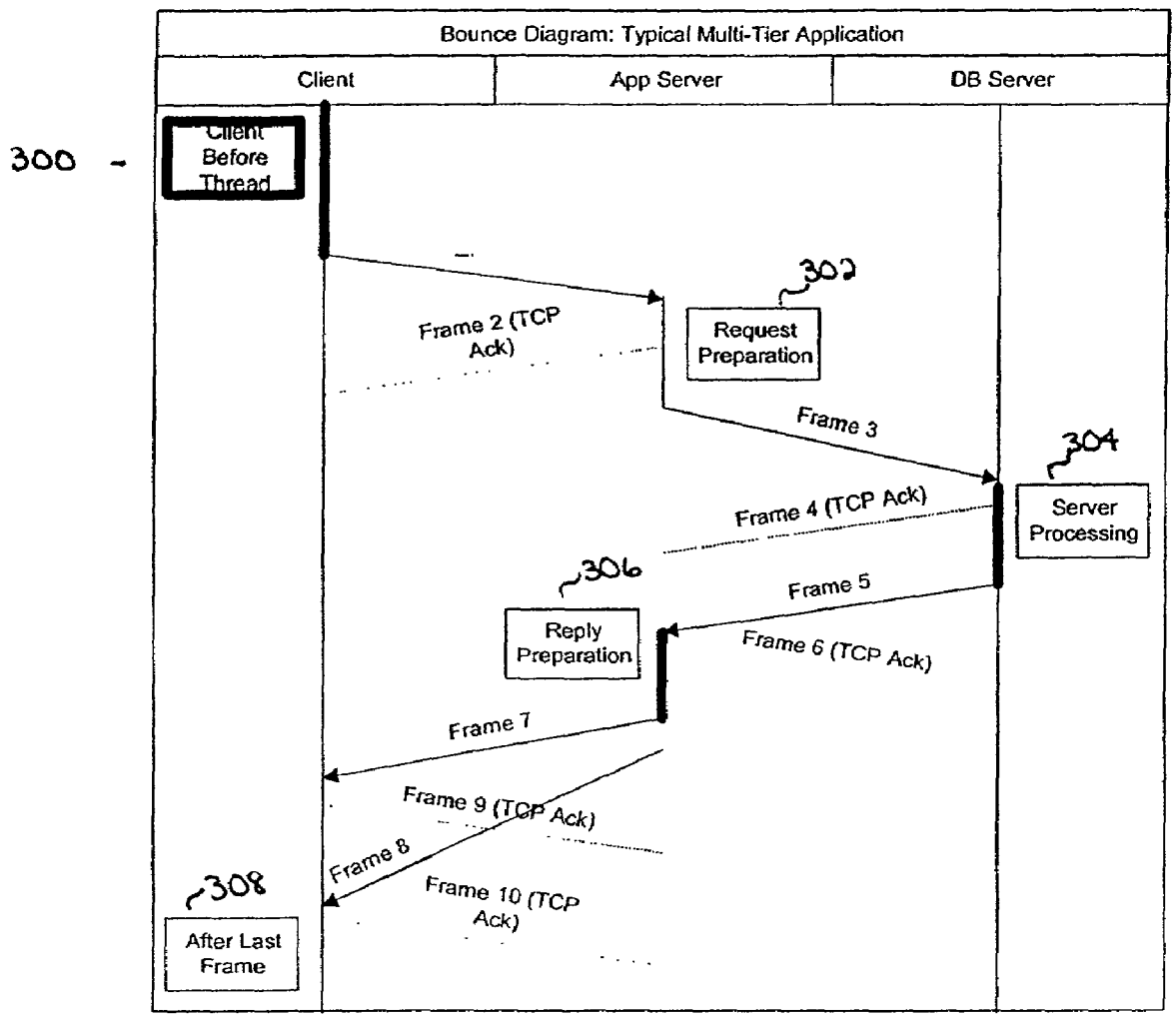
FIG. 3 illustrates an example of Request Preparation and Reply Preparation processing types.

Client Before Thread This is shown in FIG. 3 at 300, and represents the time period prior to sending of the first data frame by the client. The period extends back to the previous data frame that was received by the node, or to the beginning of the task if there is no such frame.

Client Processing This the period within a thread from receipt of a data frame by the client node to the time that node sends a subsequent request. The data frame can be on the same thread or another thread.

After last frame 308 This is the time period from the last data frame to the end of the task, and is always assigned to the client node for that task. The client node can be reassigned in the conversation map.

Server Before Thread This is similar to Client Before Thread, but arises when the first data frame in the thread is sent by the server of the thread. Normally the server does not send the first data frame, since the client normally initiates activity by sending a request. However, if the capture starts in the middle of a thread, or if the client and server are assigned incorrectly then, then this processing type results.

Note that the Thread Analysis window comprises a command to swap the client and server of a thread if they are identified incorrectly.

Server Processing 304 This is the period within a thread from receipt of the last frame in a request by the server to the time that the first response frame is returned by the server. During this time, the server is assumed to be processing the request. Note that with multi-tier applications (discussed below) there are cases where an upper-tier request may interrupt a server processing time.

Request Preparation 302 This processing type arises in multi-tier applications. It is the period from receipt of a request by a mid-level server (from a lower tier) until the mid-level server begins sending a subsequent request to another server.

Reply Preparation 306 This processing type also arises in multi-tier applications. It is the period from receipt of a reply by a mid-level server (from another server) to initiation of a reply to the requesting node.

Flows Report

A flow is a set of data frames that is sent from one node to another, comprises only frames in a single thread, and spans a time period during which no data frames travel in the opposite direction. A flow includes the TCP acknowledgements that are sent in the opposite direction before the transmission direction reverses.

Meaningful frames, discussed above, comprise all data frames and TCP acknowledgements within a data flow. TCP acknowledgements that occur after the last data frame in a flow are not meaningful frames for the purpose of network busy time computation.

In the flows report, each flow includes a number of attributes, arranged in columns, as discussed in the following sections.

Errors The flows report provides a graphical depiction of relevant errors and warnings, as with other reports. A link to the error report is provided. Since a flow comprises one or more frames, the errors associated with any frame in the flow should be included in this summary.

Sending Node This is the name and address of the node that sent the data frames in the flow. This node will receive TCP acknowledgements from the corresponding receiving node.

Receiving Node This is the name and address of the node that received the data frames in the flow. This node will send TCP acknowledgements to the corresponding sending node.

Data Duration This is the period in seconds from the time the sending node sent the first frame in the flow to the time that the receiving node received the last data frame in the flow. This is related to other fields by the relationship Data Duration=(End Data Time−Start Time)

Avg Data Rate This is the average data rate in bits/sec during the flow. This information may be important to the user, because flows with low data rate may be demand investigation. For example, the user may need to determine why the data is not being transferred more quickly, particularly if the flow is also longer than most other flows. This is computed as (Data Payload Bytes*8)/(End Data Time−Start Time).

Bytes This is the total number of bytes in all frames in the flow.

Data Payload Bytes This is the sum of the payload bytes in all frames in the flow.

Frames This is the number of frames in the flow.

Data Frames This is the number of data frames in the flow.

First Frame This is the sequence number of the first frame in the flow.

Last Data Frame This is the sequence number of the last data frame in the flow.

Last Frame This is the sequence number of the last frame, either data or acknowledgement. If there are TCP acknowledgement frames after the last data frame, then this will differ from the Last Data Frame.

Start Time This is the time that the first data frame was sent.

End Data Time This is the time that the last data frame was received.

End Time This is the time that the last frame (data or acknowledgement) was received. Note that this is normally not important because trailing TCP acknowledgements do not have an impact on the response time.

Data Direction This reflects primary-to-secondary direction or vice versa, as indicated with (→ and ←) arrows. For flows that are within a capture location, the caption "within <capture point>" appears, where <capture point> indicates the location of interest.

Network Busy Time This is the total time in seconds that one or more frames was in transit during the flow.

RTA Algorithm Details

Overall Approach

Figure 4:
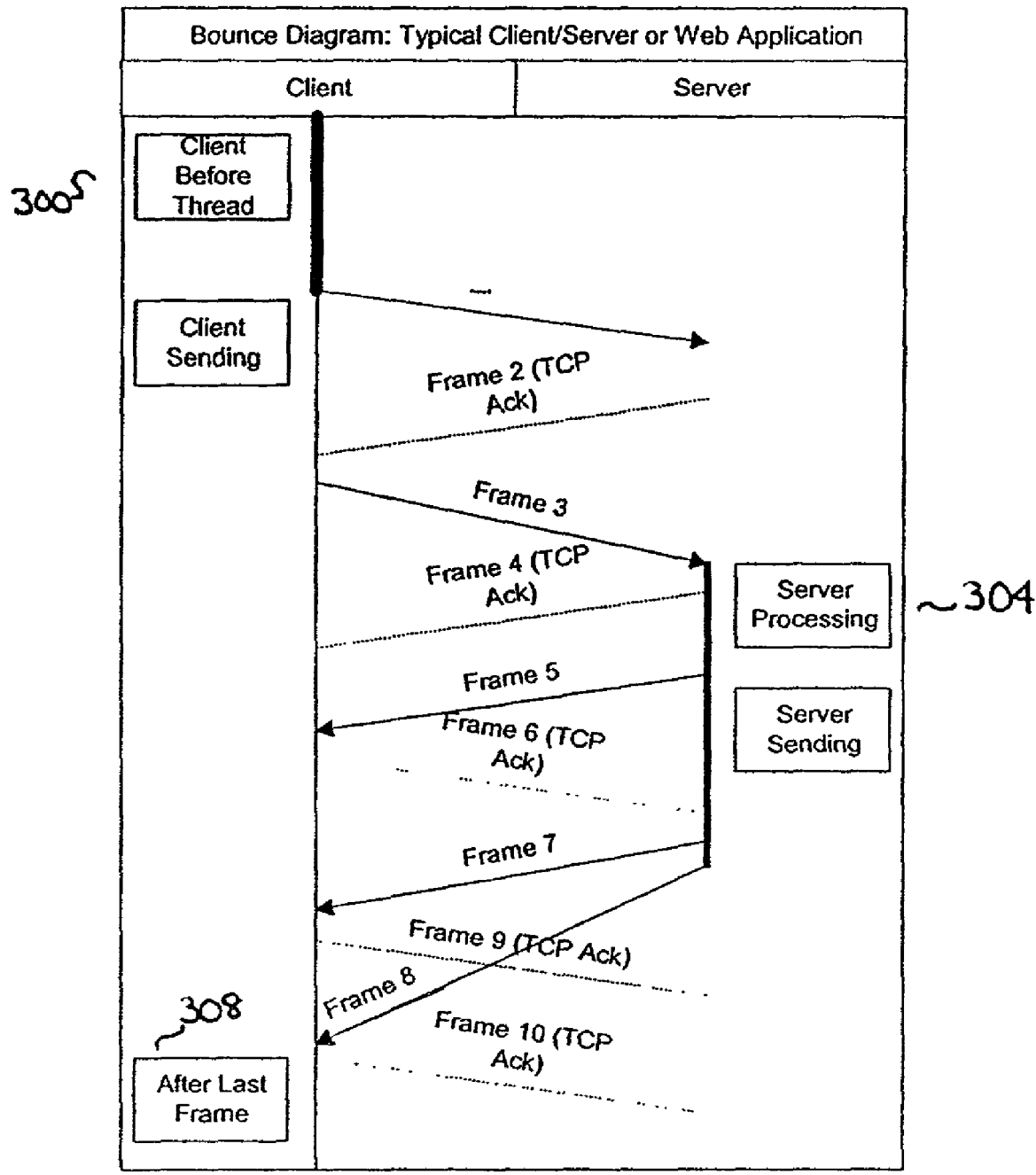
FIG. 4 illustrates one exemplary embodiment.

The RTA functions first at the thread level. Each thread is assumed to be a single-threaded sequence of request/response exchanges between the client and server. It is the responsibility of the protocol decoder to ensure this requirement. A thread is broken down into 5 time periods, described in the following sections.
Client Processing
Client Sending Flow is being sent from client to server
Server Processing
Server Sending Flow is being sent from server to client
Processing interrupted by another thread This period only occurs in the case of multi-tier or overlapping requests at the client Exemplary Embodiment—Single Thread RTA concepts are illustrated according to one embodiment as shown in FIG. 4. FIG. 4 is a bounce diagram for a typical client/server or Web application. The application could be, e.g., a 2-tier SQL application, a web browser/web server, or an application based on ad hoc protocols.

Assume that all frames shown exist within a single thread. In this example, the client sends a 2-frame request to the server, the server processes over a period, and then the server sends a 3-frame reply to the client. The diagram shows the data frames that would be exchanged, as well as exemplary TCP acknowledgements if the application uses TCP/IP. Note that TCP is a very dynamic protocol, and therefore may not send a TCP acknowledgement for every frame. Accordingly, the diagram illustrates only one of many possible variations.

Node Processing and Sending

The Application Performance Report Chart of FIG. 1 would show the processing time for the client as the sum of the two processing times identified in FIG. 4, i.e., one at the beginning and one at the end. The processing time for the server is just the single processing time 304, and the sending time for both nodes is as indicated in the FIG. 4.

Flows

Figure 5:
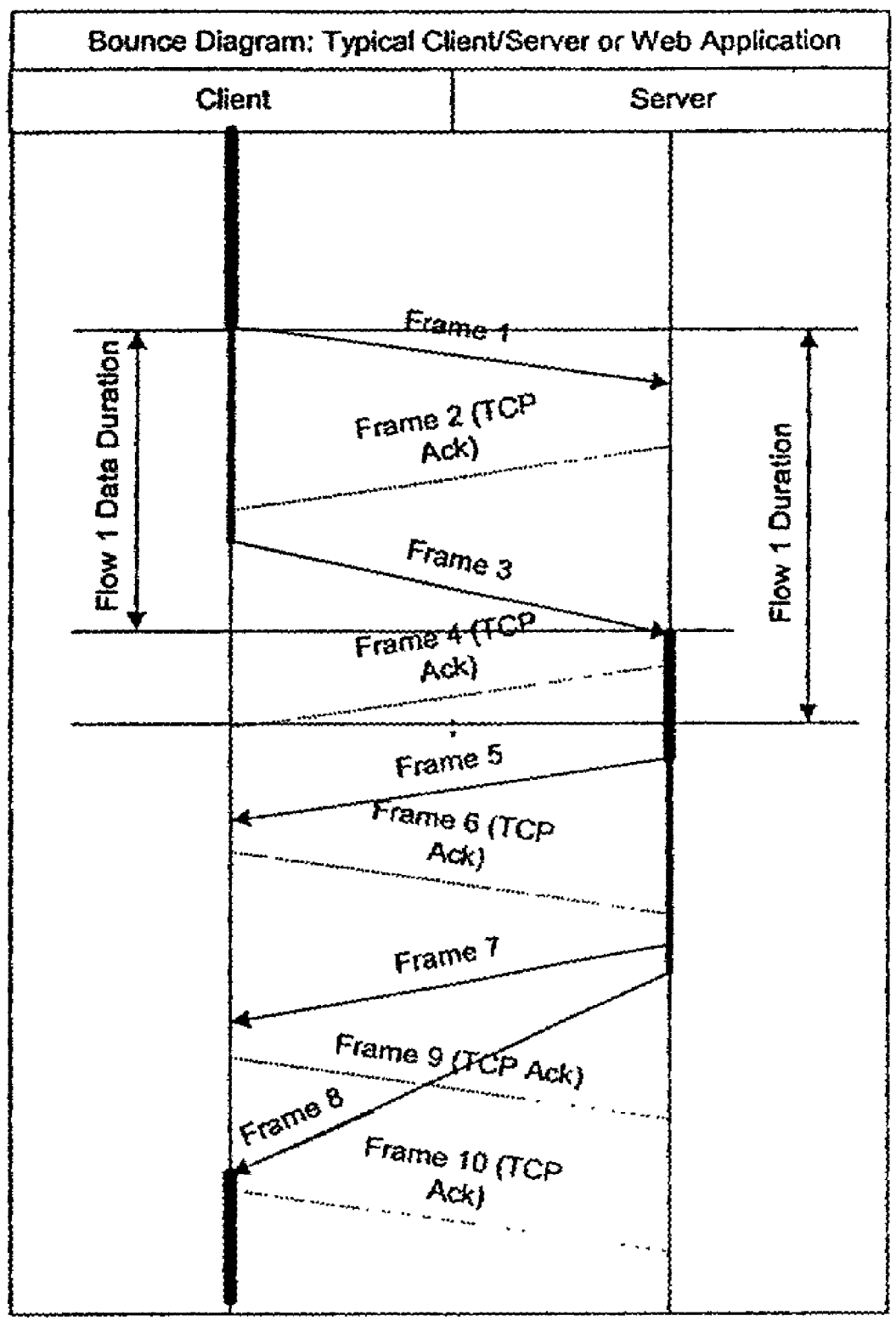
FIG. 5 illustrates an example of a flow.

In this example there are two flows. The first flow is from the client to the server and comprises frames 1 through 4. The last data frame in this flow is frame 3. The overall flow duration and flow data duration are annotated in FIG. 5. Because Frame 4 is a TCP acknowledgement that is sent after the last data frame in the flow (Frame 3) is sent, it is not considered a meaningful frame. Thus, the network is not considered busy for the time that frame 4 is in transit.

Similar analysis applies to the second flow in this example. The second flow is sent from the server to the client, and comprises frames 5 through 10. The data duration for this flow spans the time frame 5 is sent to the time frame 8 is received.

Network Frame in Transit and Latency Statistics

Again referring to FIG. 4, the times when a frame is in transit can be seen. In general, the TCP acknowledgements that are returned after data is completely received have no impact on the overall response time; therefore, they are omitted from the network Frame in Transit measure and Latency statistics. Accordingly, in this example frames 4 and 10 do not impact the user-perceived application response time, and thus they are not included in the network latency measures.

A high network-frame-in-transit time can be an indication that the combination of network latency and the application's sequential request/response behavior is affecting the response time. A high network busy time may be caused by insufficient network bandwidth. This may be investigated by consulting the network utilization information in the Performance Report Chart. This chart breaks down a network frame in transit into components caused by bandwidth and latency. If the bandwidth component dominates, then lack of bandwidth is causing the network to be busy.

Exemplary Embodiment—Multi-Thread

Node Processing and Sending Time

Node processing time analysis becomes more complicated when the application is multi-threaded. In the example above, the sum of the node processing times equals the node active times. When node processing times overlap at a node, only one such time is counted; consequently, the sum of the individual node processing times can be greater than the calculated overall node processing time.

The user is shown results for both node processing and sending times. Node processing time unambiguously reflects periods during which the node is processing requests (as a server) or processing a reply prior to sending the next request (as a client). Conversely, node sending time reflects not only node processing, but potentially other activity as well. It is difficult to determine what contributed to the node sending time without examining the individual flows sent. For example, node sending times could result from factors such as the receiving node's inability to process incoming data quickly enough, insufficient bandwidth in the network, the sending node's inability to make all of the data available quickly enough, or a TCP window size that is too small. Consequently, node sending time might contribute to the total response time. For example, in cases where the network is heavily utilized or has high latency, a high node sending time can be caused by limitations of the network. To explore this, a user can link from the node-sending-time bar to view the flows sent by that node. The user could thereby attempt to identify whether the lapse between frames sent by the node represented actual processing time. Often this determination will require some knowledge of the application.

Node Processing Times

The Node Processing Detail report (not shown) shows the processing times that were detected for each node. The report is arranged in order of descending duration, with the largest processing times at the top. Processing time at a client node begins just prior to sending the first request in a thread, and ends within a thread prior to each succeeding request that the node sends. Processing time at a server node begins when the server receives a request and ends when the server begins sending a reply.

For further understanding of node processing times, a Node Processing Detail report can be opened on a trace. The window can then be split, and the packet trace placed at the bottom. For each node processing time selected, there will be two frames surrounding the processing time. For client processing times, there will be a prior reply (or the beginning of the trace) and the request that the client sends at the end of its processing time. For server processing times, there will be the request (actually the last frame in the request if it is a multi-frame request) and the response (actually the first frame in the response if it is a multi-frame response).

Flows

As discussed previously, there can be many causes for a high node sending time, and the cause of this can be difficult to determine.

Overlapping Threads

Any time two or more threads overlap, more than one node can be processing or sending at a time. Alternately, a single node could be processing or sending on more than one thread at the same time. These processing and sending times are aggregated by concluding that a node is processing if it is processing on one or more threads, or that a node is sending if it is sending on one or more threads and is not processing.

Exemplary Embodiment—Multi—Tier

Figure 6:
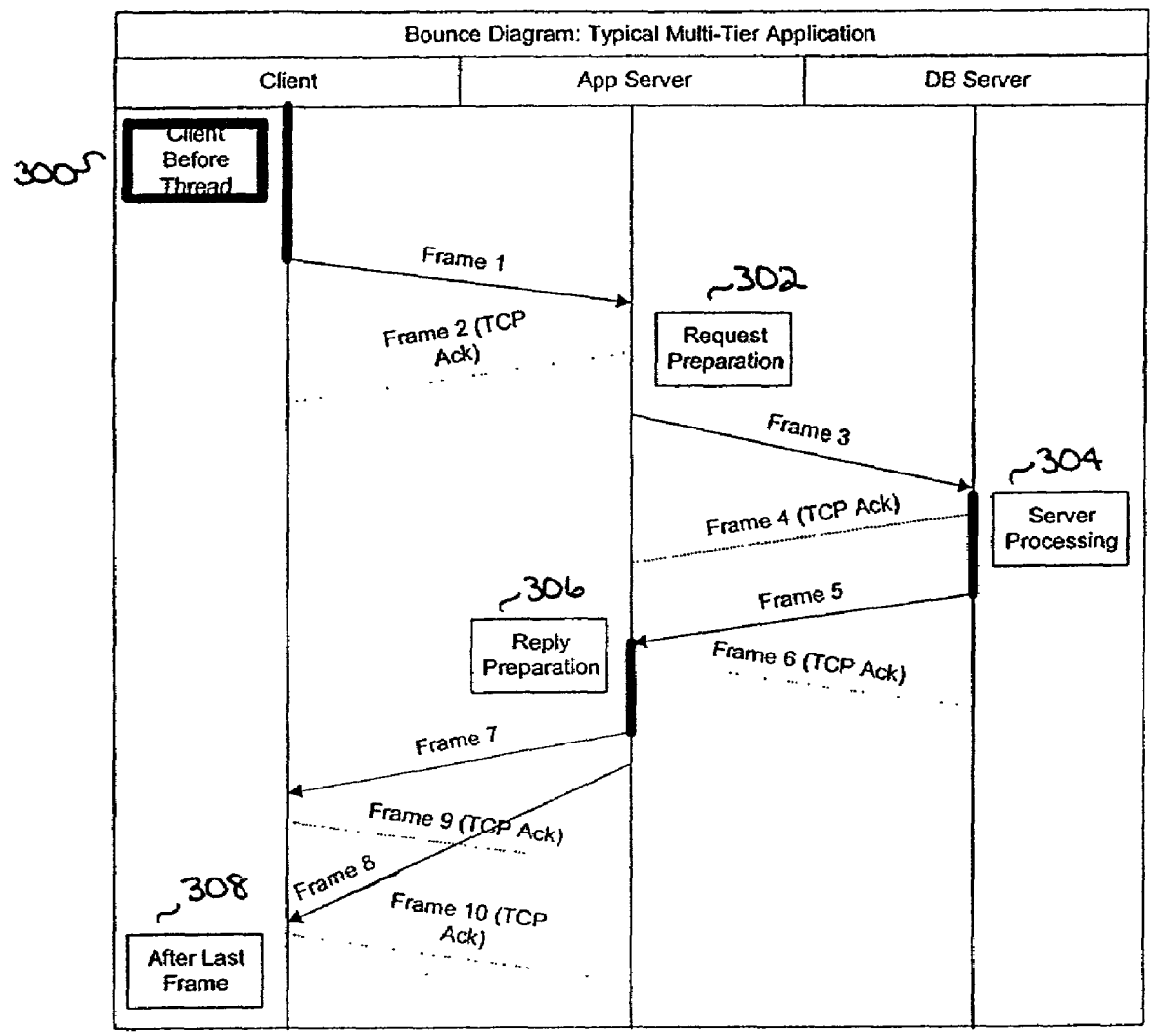
FIG. 6 illustrates an example of a multi-tier algorithm.

FIG. 6 describes the handling of multi-tier applications, as follows. At each time that a data frame enters a node, the time, frame seq# and its thread is recorded in member variables of the CNode class. When a client of a node sends out the first frame in a request, there will be a processing time. To determine its type, it is determined whether the most recent data frame that arrived at the node was a request frame from another client. If it was, then the type is 'Request Preparation,' otherwise, the type is 'Client Before Thread.'

CONCLUSION

A method and system for performing response time analysis of network performance have been described. Although the present invention has been described with reference to specific exemplary embodiments, it will be evident that various modifications and changes may be made to these embodiments without departing from the spirit and scope of the invention. Accordingly, the above description and drawings are to be regarded in an illustrative rather than a restrictive sense.

What is claimed is:

1. A method of analyzing network performance when executing a task, comprising displaying a chart, the chart further comprising:
   a first and a second times during which one or more meaningful frames within the network are traveling in a first and a second directions, respectively, the first and second times each represented by a bar that shows at least one of:
      an insertion time representing a cumulative time for one or more meaningful frames to be inserted into the network, and
      a queuing, processing and propagation (QPP) time during which the one or more meaningful frames were within the network as a result of queuing, processing, and propagation; and
   a time set representing one or more times during which each of one or more nodes in the network is respectively active during the task, wherein each of the one or more nodes is represented by a bar that shows at least one of:
 a total amount of time that the node was processing, and
 a total amount of time that the node was sending but not processing.

2. The method of claim 1, wherein the insertion time for each meaningful frame is computed as AdjustedBytes*8/Bandwidth, where AdjustedBytes represents a number of bytes that would have traversed a Wide Area Network (WAN) link in the network.

3. The method of claim 1, further comprising the step of displaying the first and second times and the time set in a detailed report.

4. The method of claim 3, wherein the detailed report further comprises one or more of:
 an overall summary comprising a duration of the task;
 a traffic section comprising byte and frame information;
 a network busy time section comprising insertion time, QPP time and total time;
 a network frame transit statistics section comprising transit times for the frames within the network during the task;
 a node active time section comprising processing and sending times for each node in the network; and
 a node processing statistics section comprising statistics on processing periods of the nodes in the network.

5. A method of analyzing network performance when executing a task, comprising displaying a detailed report, the detailed report comprising:
 a first and a second times during which one or more meaningful frames within the network are traveling in a first and second directions, respectively;
 a time set representing one or more times during which each of one or more nodes in the network is respectively active during the task;
 an overall summary comprising a duration of the task;
 a traffic section comprising byte and frame information;
 a network busy time section comprising insertion time;
 a network frame transit statistics section comprising transit times for each frame;
 a node active time section comprising processing, sending and total active times for each node in the network; and
 a node processing statistics section comprising statistics on node processing periods.

6. The method of claim 5, wherein an insertion time for each meaningful frame is displayed, the insertion time computed as AdjustedBytes*8/Bandwidth, where AdjustedBytes represents the number of bytes that would have traversed a Wide Area Network (WAN) link in the network.

* * * * *

UNITED STATES PATENT AND TRADEMARK OFFICE
CERTIFICATE OF CORRECTION

| | | |
|---|---|---|
| PATENT NO. | : 7,133,911 B1 | Page 1 of 1 |
| APPLICATION NO. | : 09/800080 | |
| DATED | : November 7, 2006 | |
| INVENTOR(S) | : Steven J. Schaffer and Jacob Weil | |

It is certified that error appears in the above-identified patent and that said Letters Patent is hereby corrected as shown below:

On Title page (item 60)
Bibliographical cover page, first column: please insert:

-- Related U.S. Application Data

Provisional application No. 60/187,135, filed on Mar. 6, 2000. --

Column 12, Line 51,

After "A" please insert --computer implemented--

Column 12, Line 52,

After "comprising" please insert --:

generating a chart to monitor a flow in the network;--

Column 14, Line 1,

After "A" please insert --computer implemented--

Column 14, Line 2,

After "comprising" please insert --:

generating a detail report to monitor a flow in the network;--

Signed and Sealed this

Twenty-seventh Day of February, 2007

JON W. DUDAS
*Director of the United States Patent and Trademark Office*